A. B. NOTT.
House-Ventilator.
No. 212,258.      Patented Feb. 11, 1879.
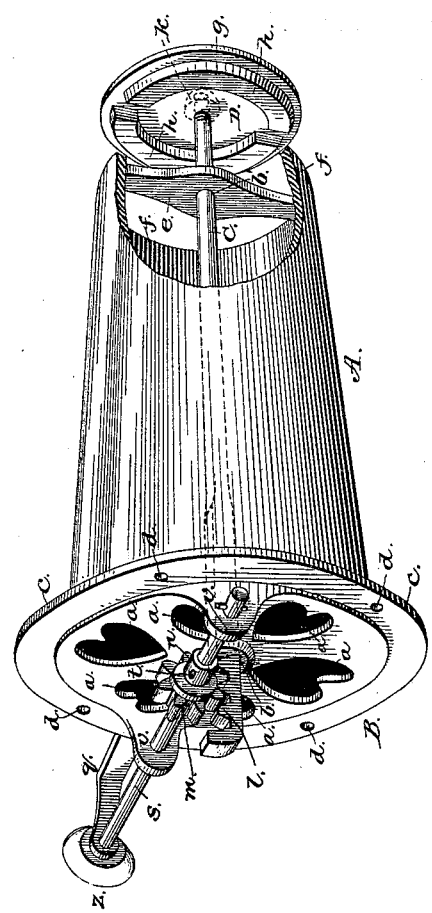
WITNESSES
John A. Ellis
F. J. Masi
INVENTOR
A. B. Nott
by E. W. Anderson,
ATTORNEY

UNITED STATES PATENT OFFICE.

AARON B. NOTT, OF FAIRHAVEN, MASSACHUSETTS.

IMPROVEMENT IN HOUSE-VENTILATORS.

Specification forming part of Letters Patent No. 212,258, dated February 11, 1879; application filed January 11, 1879.

*To all whom it may concern:*

Be it known that I, AARON B. NOTT, of Fairhaven, in the county of Bristol and State of Massachusetts, have invented a new and valuable Improvement in House-Ventilators; and I do hereby declare that the following is a full, clear, and exact description of the construction and operation of the same, reference being had to the annexed drawing, making a part of this specification, and to the letters and figures of reference marked thereon.

The drawing is a representation of a perspective view of my improved ventilator.

This invention has relation to ventilators for houses and apartments; and it consists in the construction and novel arrangement of a tapering tube having at its larger end or base a marginal fastening-flange and at each end a bearing for a central endwise-moving shaft or stem carrying at one end the ventilator valve or cover and provided at the other end with a rack and pinion, or equivalent means of operation, as hereinafter shown and described.

In the accompanying drawing, the letter A designates the tapering tube or chute, which has the form of a frustum of a cone, and is designed to be of sufficient length to extend through the wall of an apartment or building. The larger end of this tube is provided with a plate, B, having openings $a$ for the passage of the air, and a central bearing, $b$, for the operating-stem C. This plate is designed to extend beyond the outer circumference of the larger end of the conical tube and to form a fastening-flange, $c$, therefor, suitable holes $d$ being provided in this flange for the fastening nails or screws. The smaller end of the conical tube is also open, and is provided with a cross-bar, $e$, in which is a bearing-aperture, $b'$, for the other end of the stem.

The edge or margin of the smaller end, $f$, of the tube forms a close joint with the valve or cover D when the latter is brought in contact with the margin. The valve or cover D is also flanged at $g$, and is made sufficiently heavy, by means of its body-pieces $h$, to keep its form and assist in keeping it in position.

The body-pieces $h$ are usually separated, to allow for the cross-bearing $e$ at the end of the tube.

The valve is screwed on the end of the stem C, sufficient body for tapping being provided by means of a central exterior swell, $k$. The other end of the stem is provided with a rack, $l$, on one side. This rack portion is rectangular in cross-section, and passes through the rectangular aperture $b$ in the center of the end plate, B. It engages a pinion, $m$, which is provided with a sleeve, $n$, whereby it is connected to a shaft, $s$, so as to be slipped out of engagement with the ratchet when required, a small pin, $t$, passing through the sleeve and shaft, serving to key them together.

The shaft $s$ has its bearings in lugs $v$ on opposite sides of the plate B, and should extend far enough for its handle end $z$ to be within reach.

A brace-bearing, $q$, usually connects the handle end of the shaft and the margin of plate B.

In order to use the ventilator, a hole is made through the wall, and the tube inserted with the smaller end outward. The flange of the larger end is then secured to the inside wall, and forms a sufficient finish.

The valve is opened to the required degree, or closed altogether, by turning the shaft-handle $z$.

Sometimes it may be advisable to put a spiral spring on the stem, in order to give the valve more freedom of movement; and above chandeliers, and in other places, the rack-and-pinion movement may be replaced with a screw. This movement is not so rapid as the rack-and-pinion, but it facilitates the attachment of a hook to the plate B for suspending a chandelier, the warm air from which, passing upward through the tube, will aid the ventilation of the lower apartment and assist in raising the temperature of the room above.

I am aware that it is common to introduce tube-ventilators through the walls of apartments and buildings; hence I do not broadly claim such invention.

What I claim, and desire to secure by Letters Patent, is—

The ventilator consisting of the tapering tube A, its open base-plate B, having the air-holes $a$ and the central bearing $b$, the cross-bar bearing $c\ b'$ at the smaller end of said tube, the end valve, D, and its operating-stem C, reciprocating in the bearings $b\ b'$, and the rack and pinion, substantially as specified.

In testimony that I claim the above I have hereunto subscribed my name in the presence of two witnesses.

A. B. NOTT.

Witnesses:
 CHAS. DREW,
 FRANK A. RAND.